United States Patent
Hu et al.

(10) Patent No.: US 10,688,438 B2
(45) Date of Patent: Jun. 23, 2020

(54) ELECTRODIALYSIS MODULE AND ELECTRODIALYSIS SYSTEM

(71) Applicant: Industrial Technology Research Institute, Hsinchu (TW)

(72) Inventors: Po-Yu Hu, Taichung (TW); Teh-Ming Liang, Tainan (TW); Wang-Kuan Chang, Hsinchu (TW); Ren-Yang Horng, Hsinchu (TW); Chi-Chung Liao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 6 days.

(21) Appl. No.: 15/851,691

(22) Filed: Dec. 21, 2017

(65) Prior Publication Data
US 2018/0280882 A1    Oct. 4, 2018

(30) Foreign Application Priority Data
Mar. 31, 2017 (TW) ............... 106111113 A

(51) Int. Cl.
*B01D 61/42* (2006.01)
*B01D 61/46* (2006.01)
(Continued)

(52) U.S. Cl.
CPC ......... *B01D 61/422* (2013.01); *B01D 61/425* (2013.01); *B01D 61/46* (2013.01);
(Continued)

(58) Field of Classification Search
CPC ... B01D 61/425; B01D 61/422; C02F 1/4693; C02F 1/44; C02F 1/4672; C02F 3/1268;
(Continued)

(56) References Cited

U.S. PATENT DOCUMENTS 4,089,760 A    5/1978   Ono
4,361,475 A *  11/1982  Moeglich .................. C25C 7/04
                                                          204/252
(Continued)

FOREIGN PATENT DOCUMENTS

CN       1396302       2/2003
CN       1747902       3/2006
(Continued)

OTHER PUBLICATIONS

"Office Action of China Counterpart Application", dated Mar. 20, 2020, p. 1-p. 11.

*Primary Examiner* — Arun S Phasge
(74) *Attorney, Agent, or Firm* — JCIPRNET

(57) ABSTRACT

An electrodialysis module includes at least one base unit. The base unit includes a working tank, a first ion-exchange membrane, a second ion-exchange membrane, at least one first electrode, and at least two second electrodes. The first ion-exchange membrane and the second ion-exchange membrane are located in the working tank. The first ion-exchange membrane and the second ion-exchange membrane together divide the working tank into two electrode compartments and a desalination compartment therebetween. The at least one first electrode is disposed in the desalination compartment. The at least two second electrodes are disposed in each of the electrode compartments, respectively, in which the at least two second electrodes and the at least one first electrode have different polarities.

16 Claims, 5 Drawing Sheets

(51) Int. Cl.
*C02F 1/469* (2006.01)
*C02F 3/12* (2006.01)
*C02F 1/44* (2006.01)
*C02F 1/467* (2006.01)
*C02F 1/461* (2006.01)

(52) U.S. Cl.
CPC .............. *C02F 1/4693* (2013.01); *C02F 1/44* (2013.01); *C02F 1/4672* (2013.01); *C02F 3/1268* (2013.01); *C02F 2001/46133* (2013.01); *Y02A 20/134* (2018.01); *Y02W 10/15* (2015.05)

(58) Field of Classification Search
CPC ........ C02F 2001/46133; Y02A 20/134; Y02W 10/15
See application file for complete search history.

(56) References Cited

U.S. PATENT DOCUMENTS 8,088,266 B2  1/2012 Dove et al.
2008/0017513 A1  1/2008 Bazinet et al.
2014/0318972 A1*  10/2014 Bazant ................ B01D 61/425
                                                            204/633
2015/0064501 A1  3/2015 Ren et al.

FOREIGN PATENT DOCUMENTS

| | | |
|---|---|---|
| CN | 1809415 | 7/2006 |
| CN | 101249385 | 8/2008 |
| CN | 101817513 | 9/2010 |
| CN | 102041279 | 5/2011 |
| CN | 103012106 | 4/2013 |
| CN | 103168034 | 6/2013 |
| CN | 205740455 | 11/2016 |
| JP | 3794354 | 7/2006 |
| TW | I230631 | 4/2005 |
| TW | I232772 | 5/2005 |
| TW | 200922881 | 6/2009 |
| TW | I354653 | 12/2011 |
| TW | I388511 | 3/2013 |
| TW | 201335077 | 9/2013 |
| TW | I460005 | 11/2014 |
| TW | I543809 | 8/2016 |
| WO | 2014132888 | 9/2014 |
| WO | 2015098957 | 7/2015 |
| WO | 2016201563 | 12/2016 |

\* cited by examiner

ELECTRODIALYSIS MODULE AND ELECTRODIALYSIS SYSTEM

CROSS-REFERENCE TO RELATED APPLICATION

This application claims the priority benefit of Taiwan application serial no. 106111113, filed on Mar. 31, 2017. The entirety of the above-mentioned patent application is hereby incorporated by reference herein and made a part of this specification.

TECHNICAL FIELD

The disclosure relates to an electrodialysis module, and particularly relates to an electrodialysis module for isolation and purification.

BACKGROUND

Due to organic acids and caustic soda are widely used in chemical raw materials, medicine, food, feed, etc., there is a general need for increased concentration of organic acids or caustic soda in all areas. However, whether the concentration methods for organic acid back-end products such as evaporation crystallization, solvent extraction, or calcium salt method, or the current concentration method for caustic soda such as evaporation concentration, there exist shortcomings of energy consumption, low yield, complicated procedure, or high impurity, resulting in the cost cannot be reduced. Additionally, although there is a technique of two-stage dialysis by combining a bipolar membrane for recovering the organic acids in the present study, the use of bipolar membrane is costly, and the amount of dialysis thereof is low, so that it is not suitable for use in various industries at this stage. Therefore, the development of a concentration method for organic acid and caustic soda with both low cost and high recovery rate has become an important topic in the industry.

SUMMARY

The disclosure provides an electrodialysis module and an electrodialysis system, which can effectively isolate salts from a solution, so as to purify acids or alkalis in the solution.

The disclosure provides an electrodialysis module including at least one base unit. The base unit includes a working tank, a first ion-exchange membrane, a second ion-exchange membrane, at least one first electrode, and at least two second electrodes. The first ion-exchange membrane is located in the working tank. The second ion-exchange membrane is located in the working tank. The first ion-exchange membrane and the second ion-exchange membrane together divide the working tank into two electrode compartments and a desalination compartment located between the two electrode compartments. The at least one first electrode is disposed in the desalination compartment. The at least two second electrodes are respectively disposed in each of the electrode compartments. The at least two second electrodes and the at least one first electrode have different polarities.

The disclosure also provides an electrodialysis system including an aforementioned electrodialysis module and an application unit. The application unit is connected to the electrodialysis module by a connector.

The disclosure further provides an electrodialysis module including at least one base unit. The base unit includes a working tank, a first ion-exchange membrane, a second ion-exchange membrane, two partitions, at least one first electrode, and at least two second electrodes. The first ion-exchange membrane is located in the working tank. The second ion-exchange membrane is located in the working tank. The two partitions are disposed in the working tank. The two partitions, the first ion-exchange membrane, and the second ion-exchange membrane together divide the working tank into two electrode compartments, two inter-compartments, and a desalination compartment located between the two inter-compartments. Each of the inter-compartments is located between the desalination compartment and the corresponding electrode compartment. The at least one first electrode is disposed in the desalination compartment. The at least two second electrodes are respectively disposed in each of the electrode compartments. The at least two second electrodes and the at least one first electrode have different polarities.

The disclosure further provides an electrodialysis system including an aforementioned electrodialysis module and an application unit. The application unit is connected to the electrodialysis module by a connector.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
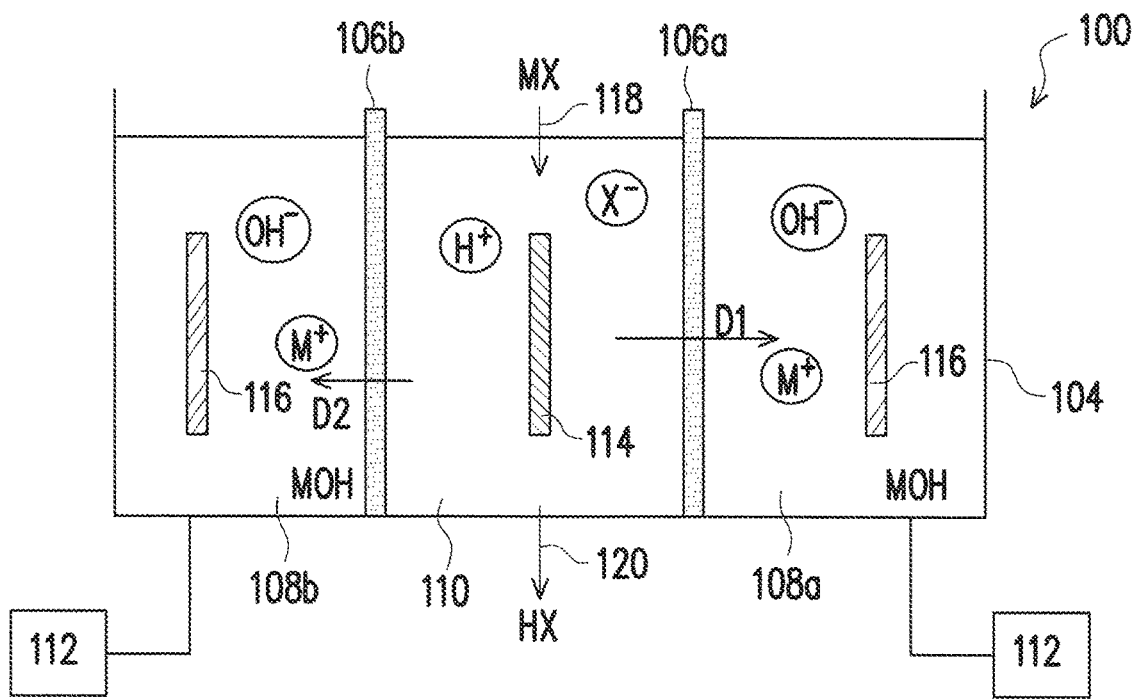
FIG. 1 is a schematic diagram illustrating an electrodialysis module according to an exemplary embodiment of the disclosure.

The disclosure is illustrated more comprehensively referring to the drawings of the embodiments. However, the disclosure may be embodied in many different forms and should not be construed as limited to the embodiments set forth herein. Thicknesses of layers and regions in the drawings may be enlarged for clarity. The same or similar reference numbers represent the same or similar components, and are not repeated again in the following paragraphs.

FIG. 1 is a schematic diagram illustrating an electrodialysis module according to an exemplary embodiment of the disclosure.

Referring to FIG. 1, an electrodialysis module 100 includes at least one base unit 102. In some embodiments, the base unit 102 may be more than one, and the number thereof may be properly adjusted according to the required time, the expected concentrated concentration, or the required pH value of the solution for isolation and purification. In the embodiment with a plurality of base units 102, the base units 102 are connected to each other in parallel.

The base unit 102 includes a working tank 104, a first ion-exchange membrane 106a, a second ion-exchange membrane 106b, at least one first electrode 114, and at least two second electrodes 116. The first ion-exchange membrane 106a and the second ion-exchange membrane 106b are located in the working tank 104 and together divide the working tank 104 into an electrode compartment 108a, an electrode compartment 108b, and a desalination compartment 110 located between the electrode compartment 108a and the electrode compartment 108b. In an embodiment, the solutions in the desalination compartment 110 and the electrode compartments 108a and 108b are respectively separated by the first ion-exchange membrane 106a and the second ion-exchange membrane 106b, so that the solutions in the desalination compartment 110 and the electrode compartments 108a and 108b do not flow to each other, so as to avoid the electrodialysis module 100 cannot work normally. In another embodiment, the solutions in the electrode compartment 108a and the electrode compartment 108b may be an acid solution, such as sulfuric acid ($H_2SO_4$), hydrochloric acid (HCl), nitric acid ($HNO_3$), or a combination thereof. In another embodiment, the solutions in the electrode compartment 108a and the electrode compartment 108b may be an alkaline solution, such as sodium hydroxide (NaOH), potassium hydroxide (KOH), sodium sulfate ($Na_2SO_4$), or a combination thereof.

In some embodiments, the electrode compartments 108a and 108b may be optionally connected to a storage tank 112, so that the solution in the electrode compartments 108a and 108b are connected to the solution in the storage tank 112. The storage tank 112 may provide the solution for the electrode compartments 108a and 108b, so as to increase the volume of the solutions in the electrode compartments 108a and 108b to stabilize the pH value. In an embodiment, the electrode compartment 108a and the electrode compartment 108b are respectively connected to different storage tanks 112, so that the solutions in the electrode compartment 108a and the electrode compartment 108b are not connected to each other. In another embodiment, the electrode compartment 108a and the electrode compartment 108b may be connected to the same storage tank 112, so that the solutions in the electrode compartments 108a and 108b may be connected to each other.

In some embodiments, the first ion-exchange membrane 106a and the second ion-exchange membrane 106b may be polymer membranes which are selective for anions or cations. For instance, the ion-exchange membranes 106a and 106b may be cation exchange membranes (CEMs) or anion exchange membranes (AEMs). For instance, the cation exchange membrane is a membrane containing an acid functional group, such as a membrane containing a strong acidic sulfonic acid ion exchange resin, a homogeneous or heterogeneous dialysis membrane with cation selectivity, or a combination thereof. The anion exchange membrane is a membrane containing an alkaline functional group, such as a membrane containing a strong alkaline quarternary ammonium ion exchange resin, a homogeneous or heterogeneous dialysis membrane with anion selectivity, or a combination thereof. In an embodiment, the ion-exchange membranes 106a and 106b may have the same polarity. For instance, the ion-exchange membrane 106a and the ion-exchange membrane 106b may be both the cation exchange membranes or may be both the anion exchange membranes. The aforementioned "cation exchange membrane" indicates a thin film that the cations can pass through while the anions cannot. The aforementioned "anion exchange membrane" indicates a thin film that the anions can pass through while the cations cannot.

In the embodiment, the base unit 102 includes one first electrode 114 and two second electrodes 116, but the disclosure is not limited thereto. The first electrode 114 is disposed in the desalination compartment 110. The two second electrodes 116 are respectively disposed in the electrode compartment 108a and the electrode compartment 108b. In an embodiment, the polarity of the first electrode 114 is different from that of the two second electrodes 116, thereby improving the efficiency of electrodialysis in the desalination compartment 110.

For instance, in the case that the first electrode 114 is an anode and the second electrode 116 is a cathode, after a solution containing a salt MX (target solution) is injected into the desalination compartment 110 from an inlet 118, the salt MX will dissociate into cations $M^+$ (e.g., metal cations) and anions $X^-$ (e.g., acid ions) by applying an electric field (the anode is applied with a positive potential, and the cathode is applied with a negative potential). $M^+$ may be with +1 valence, +2 valence, or +3 valence, but the disclosure is not limited thereto. $X^-$ may be with −1 valence, −2 valence, or −3 valence, but the disclosure is not limited thereto. In the case of repulsion between similar charges and attraction between different charges, some cations $M^+$ are moved into the electrode compartment 108a disposed at one side of the desalination compartment 110 through the first ion-exchange membrane 106a along a first direction D1, and some other the cations $M^+$ are moved into the electrode compartment 108b at another side of the desalination compartment 110 through the second ion-exchange membrane 106b along a second direction D2. Therefore, the anion $X^-$ in the desalination compartment 110 will form an acid HX with a hydrogen ion $H^+$ (referring to the anode half-reaction formula as shown in the following formula 1) generated by the anode (the first electrode 114), and the cation $M^+$ in the electrode compartments 108a and 108b will form an alkali MOH (or represented as $M(OH)_n$, wherein n is the valence of M) with a hydroxyl ion $OH^-$ (referring to the cathode half-reaction formula as shown in the following formula 2) generated by the cathode (the second electrode 116).

In other words, the acid solution injected into the desalination compartment 110 from the inlet 118 may be concentrated/purified by removing the salt contained in the solution, so as to obtain an acid liquid with high concentration at the outlet 120. Also, the caustic soda with a wide range of application may be obtained at the electrode compartments 108a and 108b. In some specific application areas, the caustic soda in the electrode compartments 108a and 108b may be used as a regulator for pH value.

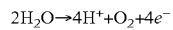  [formula 1]

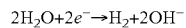  [formula 2]

In another embodiment, to further improve the efficiency of acid production in the desalination compartment 110 and the efficiency of alkali production in the electrode compartments 108a and 108b, the first ion-exchange membrane 106a and the second ion-exchange membrane 106b may be both cation exchange membranes, so that the anions $X^-$ are stayed in the desalination compartment 110 instead of passing through the first ion-exchange membrane 106a and the second ion-exchange membrane 106b. Therefore, there are more anions $X^-$ which can form the acid HX with the hydrogen ions $H^+$ in the desalination compartment 110, and there are more cations $M^+$ which can form the alkali MOH with the hydroxyl ions $OH^-$ in the electrode compartments 108a and 108b. Thus, the efficiency of acid production in the desalination compartment 110 and the efficiency of alkali production in the electrode compartments 108a and 108b can be further improved.

Additionally, in yet another embodiment, to further improve the concentration of the acid in the desalination compartment 110 and the concentration of the caustic soda in the electrode compartments 108a and 108b, the solution flowing out from the outlet 120 may be re-injected into the desalination compartment 110 to isolate the salt which are not removed from the solution. In other words, the concentration of the acid in the desalination compartment 110 and the concentration of the caustic soda in the electrode compartments 108a and 108b may be further improved by cycle operation.

In an exemplary embodiment, the first electrode 114 is an anode, and the second electrode 116 is a cathode. After a solution containing sodium formate (HCOONa) is injected into the desalination compartment 110 from the inlet 118, sodium formate will dissociate into sodium ions ($Na^+$) and formate ions ($HCOO^-$) in the desalination compartment 110. The formate ions will stay in the desalination compartment 110 and form formic acid (HCOOH) with hydrogen ions $H^+$ generated by the anode. On the other hand, the sodium ions will pass through the cation exchange membranes 106a and 106b along the first direction D1 and the second direction D2 respectively, and will form sodium hydroxide (NaOH) with hydroxyl ions $OH^-$ generated by the cathode in each of the electrode compartments 108a and 108b.

In another embodiment, the first electrode 114 is an anode, and the second electrode 116 is a cathode. A material of the anode is selected from the group consisting of iridium oxide ($IrO_2$), ruthenium oxide ($RuO_4$), lead oxide ($PbO_2$), copper (Cu), zinc (Zn), lead (Pb), aluminum (Al), gold (Au), titanium (Ti), silver (Ag), iron (Fe), platinum (Pt), stainless steel, an oxide thereof, an alloy thereof and a combination thereof, for example. A material of the cathode is selected from the group consisting of stainless steel, iron (Fe), platinum (Pt), titanium (Ti), iridium oxide ($IrO_2$), mercury (Hg), an oxide thereof, an alloy thereof and a combination thereof, for example. In yet another embodiment, to improve the efficiency of salt isolation in the desalination compartment 110, the material of the first electrode 114 as the anode may be selected from the materials with an overpotential for oxygen evolution of 1.5 V to 2 V (scanning from 0 V to 5 V using a potentiostat) in a 0.2 wt % sodium hypochlorite (NaClO) solution. For instance, the material of the first electrode 114 may be selected from the group consisting of $IrO_2$, $PbO_2$, Pb, Ag, Fe, Pt, stainless steel, Ti, an oxide thereof, an alloy thereof and a combination thereof, for example. In the 0.2 wt % NaClO solution, the overpotential for oxygen evolution of Ti is 2.0 V, for example, the overpotential for oxygen evolution of iridium oxide on a Ti matrix ($IrO_2$/Ti) is 1.6 V, for example, the overpotential for oxygen evolution of platinum on a Ti matrix (Pt/Ti) is 1.6 V, for example, and the overpotential for oxygen evolution of $PbO_2$ is 1.9 V, for example. The aforementioned "overpotential for oxygen evolution" indicates the potential that water is electrolyzed and generates oxygen at the anode.

Figure 2:
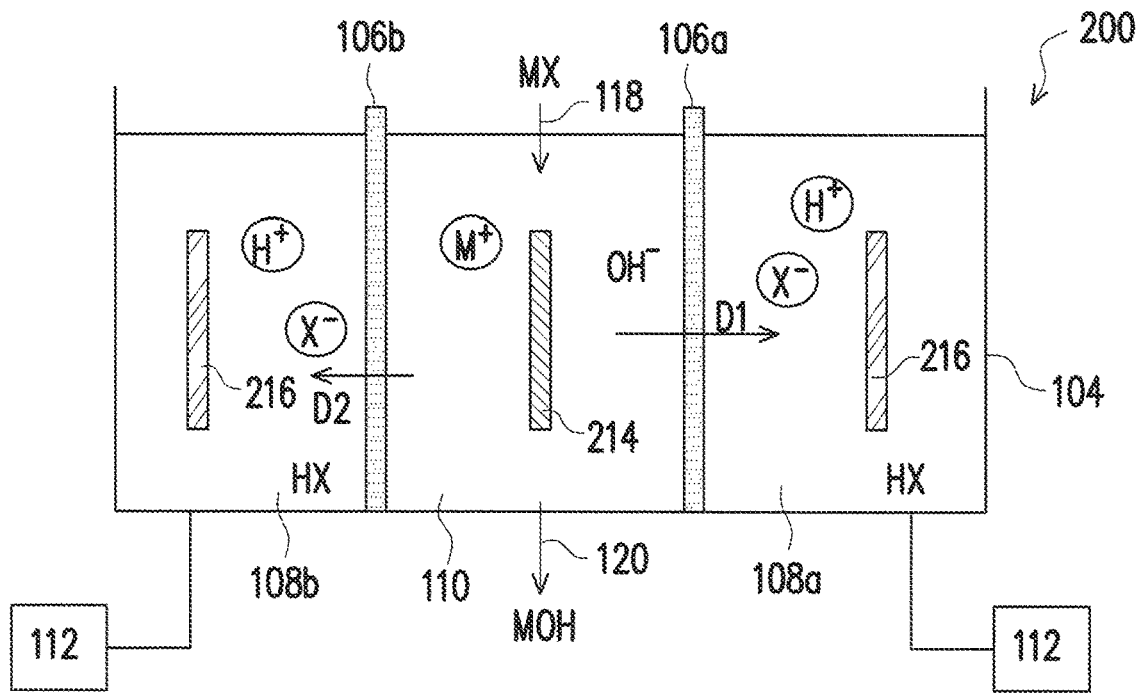
FIG. 2 is a schematic diagram illustrating an electrodialysis module according to another exemplary embodiment of the disclosure.

FIG. 2 is a schematic diagram illustrating an electrodialysis module according to another exemplary embodiment of the disclosure. An electrodialysis module 200 in FIG. 2 is substantially the same as the electrodialysis module 100 in FIG. 1, and the difference therebetween is that a first electrode 214 in a base unit 202 is a cathode, and two second electrodes 216 are anodes. Thus, the same or similar components are referred to by the same or similar reference numerals. The connection, material, and process of the remaining components are described in detail above, and will not be repeated again below.

Referring to FIG. 2, in the case that the first electrode 214 is a cathode and the second electrodes 216 are anodes, after the solution containing the salt MX is injected into the desalination compartment 110 from the inlet 118, the salt MX will dissociate into the cations $M^+$ (e.g., metal cations) and anions $X^-$ (e.g., acid ions) by applying the electric field (the cathode is applied with a negative potential, and the anode is applied with a positive potential). In the case of repulsion between similar charges and attraction between different charges, some anions $X^-$ are moved into the electrode compartment 108a disposed at one side of the desalination compartment 110 through the first ion-exchange membrane 106a along the first direction D1, and some other anions $X^-$ are moved into the electrode compartment 108b disposed at another side of the desalination compartment 110 through the second ion-exchange membrane 106b along the second direction D2. Therefore, the cations $M^+$ in the desalination compartment 110 will form an alkali MOH with the hydroxyl ions $OH^-$ generated by the cathode (the first electrode 214), and the anions $X^-$ in the electrode compartments 108a and 108b will form an acid HX with the hydrogen ions $H^+$ generated by the anode (the second electrode 216). In addition, the hydroxyl ions $OH^-$ generated by the cathode (the first electrode 214) may change the activity coefficient of ion of the solution. Thereby, the solubility of the salt MX in the solution is decreased. Thus, the anions $X^-$ are easily passed through the first ion-exchange membrane 106a and the second ion-exchange membrane 106b to move into the electrode compartments 108a and 108b, so as to be combined with the hydrogen ions $H^+$ generated by electrolysis of the second electrode 216 to generate the acid HX, and the reaction of acidification is occurred therein. In other words, the pH value of the solution injected into the desalination compartment 110 from the inlet 118 may be increased by removing the salt MX contained in the solution, so that the alkaline liquid with high pH value and lower salt MX content may be obtained at the outlet 120, and the acid liquid with high concentration may be obtained in the electrode compartments 108a and 108b. Furthermore, in another embodiment, to further improve the efficiency of alkali production in the desalination compartment 110 and the efficiency of acid production in the electrode compartments 108a and 108b, the first ion-exchange membrane 106a and the second ion-exchange membrane 106b may be anion exchange membranes, so that the cations $M^+$ cannot pass through the first ion-exchange membrane 106a and the second ion-exchange membrane 106b to be stayed in the desalination compartment 110. Therefore, there are more cations $M^+$ which can form the alkali MOH with the hydroxyl ions $OH^-$ in the desalination compartment 110, and there are more anions $X^-$ which can form the acid HX with the hydrogen ion H$^+$ in the electrode compartments 108a and 108b. Thus, the efficiency of alkali production in the desalination compartment 110 and the efficiency of acid production in the electrode compartments 108a and 108b can be further improved.

Additionally, in yet another embodiment, to further improve the pH value of the liquid alkaline MOH in the desalination compartment 110 and the concentration of the acid HX in the electrode compartments 108a and 108b, the solution flowing out from the outlet 120 may be re-injected into the desalination compartment 110 to isolate the salt MX which are not removed from the solution. In other words, the pH value of the solution in the desalination compartment 110 and the concentration of the acid HX in the electrode compartments 108a and 108b can be further improved by cycle operation.

In some exemplary embodiments, the first electrode 214 is a cathode, and the second electrode 216 is an anode. After the solution containing itaconate is injected into the desalination compartment 110 from the inlet 118, the acid radical ions of itaconic acid (IA) in the electrode compartments 108a and 108b will form itaconic acid with the hydrogen ions generated by the anode (the second electrode 216).

In another embodiment, the first electrode 214 is a cathode, and the second electrode 216 is an anode. A material of the cathode is selected from the group consisting of stainless steel, Pt, Ti, IrO$_2$, Hg, Fe, and a combination thereof, for example. A material of the anode is selected from the group consisting of IrO$_2$, RuO$_4$, PbO$_2$, Cu, Zn, Pb, Al, Au, and a combination thereof, for example. Additionally, in an embodiment, to improve the efficiency of salt isolation in the desalination compartment 110, the first electrode 214 may be selected from the materials with a hydrogen evolution potential of −0.5 V to −1.5V (scanning from 0 V to −5 V using a potentiostat) in a 0.2 wt % NaClO solution. For instance, the material of the first electrode 214 used as the cathode may be selected from the group consisting of stainless steel, iron, Pt, and Ti. In another embodiment, in the 0.2 wt % NaClO solution, the hydrogen evolution potential of Ti is −1.0 V, for example, the hydrogen evolution potential of iridium oxide on a Ti matrix (IrO$_2$/Ti) is −1.7 V, for example, the hydrogen evolution potential of platinum on a Ti matrix (Pt/Ti) is −0.8 V, for example, and the hydrogen evolution potential of the stainless steel (e.g., 304 grade stainless steel) is −1.4 V, for example. The aforementioned "hydrogen evolution potential" indicates the potential that water is electrolyzed and generates hydrogen at the cathode.

Figure 3:
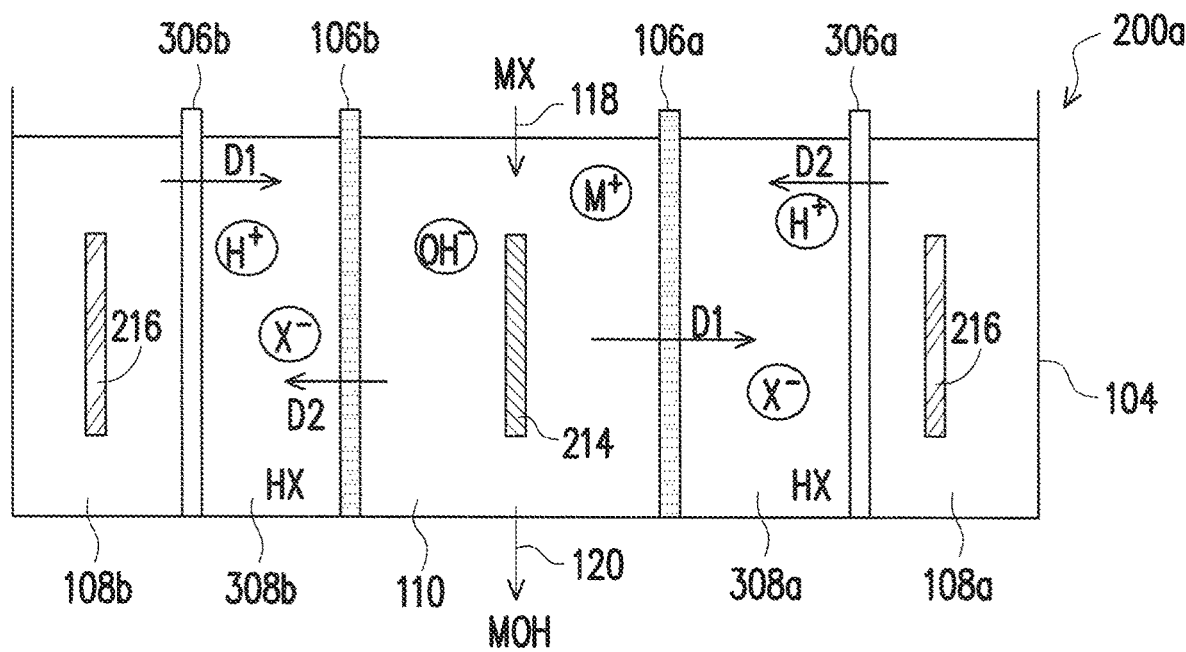
FIG. 3 is a schematic diagram illustrating an electrodialysis module according to yet another exemplary embodiment of the disclosure.

FIG. 3 is a schematic diagram illustrating an electrodialysis module according to another exemplary embodiment of the disclosure. An electrodialysis module 200a in FIG. 3 is substantially the same as the electrodialysis module 200 in FIG. 2, and the difference therebetween is that the working tank 104 further includes partitions 306a and 306b. The partitions 306a and 306b, the first ion-exchange membrane 106a, and the second ion-exchange membrane 106b together divide the working tank 104 into the electrode compartments 108a and 108b, the inter-compartments 308a and 308b, and the desalination compartment 110. The desalination compartment 110 is located between the inter-compartment 308a and the inter-compartment 308b. The inter-compartment 308a is located between the electrode compartment 108a and the desalination compartment 110. The inter-compartment 308b is located between the electrode compartment 108b and the desalination compartment 110. In some embodiments, the partitions 306a and 306b have liquid permeability, which does not prevent the flow of the liquid, and are permeable partitions with support except for the ion-exchange membrane, such as a compression plate. A material of the partitions 306a and 306b includes polymers or resins, such as polypropylene (PP), polyethylene (PE), polystyrene (PS), ABS resins, polyvinyl chloride (PVC), acrylic resins, nylon (PA), or a combination thereof. In the embodiment, the same or similar components to the aforementioned embodiment are referred to by the same or similar reference numerals. Otherwise, the connection, material, and process of the remaining components are described in detail above, and will not be repeated again below.

Referring to FIG. 3, a base unit 202a includes one first electrode 214 and two second electrodes 216, but the disclosure is not limited thereto. The first electrode 214 is disposed in the desalination compartment 110. The two second electrodes 216 are respectively disposed in the electrode compartment 108a and the electrode compartment 108b. In the case that the first electrode 214 is a cathode and the second electrodes 216 are anodes, after the solution containing the salt MX is injected into the desalination compartment 110 from the inlet 118, the salt MX will dissociate into the cations M$^+$ and the anions X$^-$ by applying the electric field. In the case of repulsion between similar charges and attraction between different charges, some anions X$^-$ are moved into the inter-compartment 308a located at one side of the desalination compartment 110 through the first ion-exchange membrane 106a along the first direction D1, and other some anions X$^-$ are moved into the inter-compartment 308b at another side of the desalination compartment 110 through the second ion-exchange membrane 106b along the second direction D2. In addition, the hydrogen ions H$^+$ generated by the anode (the second electrode 216) disposed in the electrode compartment 108a will also move into the inter-compartment 308a through the partition 306a along the second direction D2, and the hydrogen ions H$^+$ generated by the anode (the second electrode 216) in another electrode compartment 108b will move into the inter-compartment 308b through the partition 306b along the first direction D1. That is, the cations M$^+$ will form an alkali MOH with the hydroxyl ions OH$^-$ generated by the cathode (the first electrode 214), and the anions X$^-$ in the inter-compartments 308a and 308b will form an acid HX with the hydrogen ions H$^+$ moved from the electrode compartments 108a and 108b.

In yet another embodiment, the partitions 306a and 306b may be ion-exchange membranes. Specifically, the partitions 306a and 306b may be ion-exchange membranes having different polarity from the first ion-exchange membrane 106a and the second ion-exchange membrane 106b, so as to further improve the efficiency of acid production in the inter-compartments 308a and 308b. For instance, the first ion-exchange membrane 106a and the second ion-exchange membrane 106b are anion exchange membranes, and the partitions 306a and 306b are cation exchange membranes. Therefore, the hydrogen ions H$^+$ can pass through the partitions (cation exchange membranes) 306a and 306b to move into the inter-compartments 308a and 308b, but cannot pass through the first ion-exchange membrane (anion exchange membrane) 106a and the second ion-exchange membrane (anion exchange membrane) 106b. The anions X$^-$ can pass through the first ion-exchange membrane (anion exchange membrane) 106a and the second ion-exchange membrane (anion exchange membrane) 106b to move into the inter-compartments 308a and 308b, but cannot pass through the partitions (cation exchange membranes) 306a and 306b. Thus, there are more hydrogen ions H⁺ which can form the acid HX with the anions X⁻ in the inter-compartments 308a and 308b, so that the efficiency of acid production in the desalination compartment 110 can be further improved.

Figure 4:
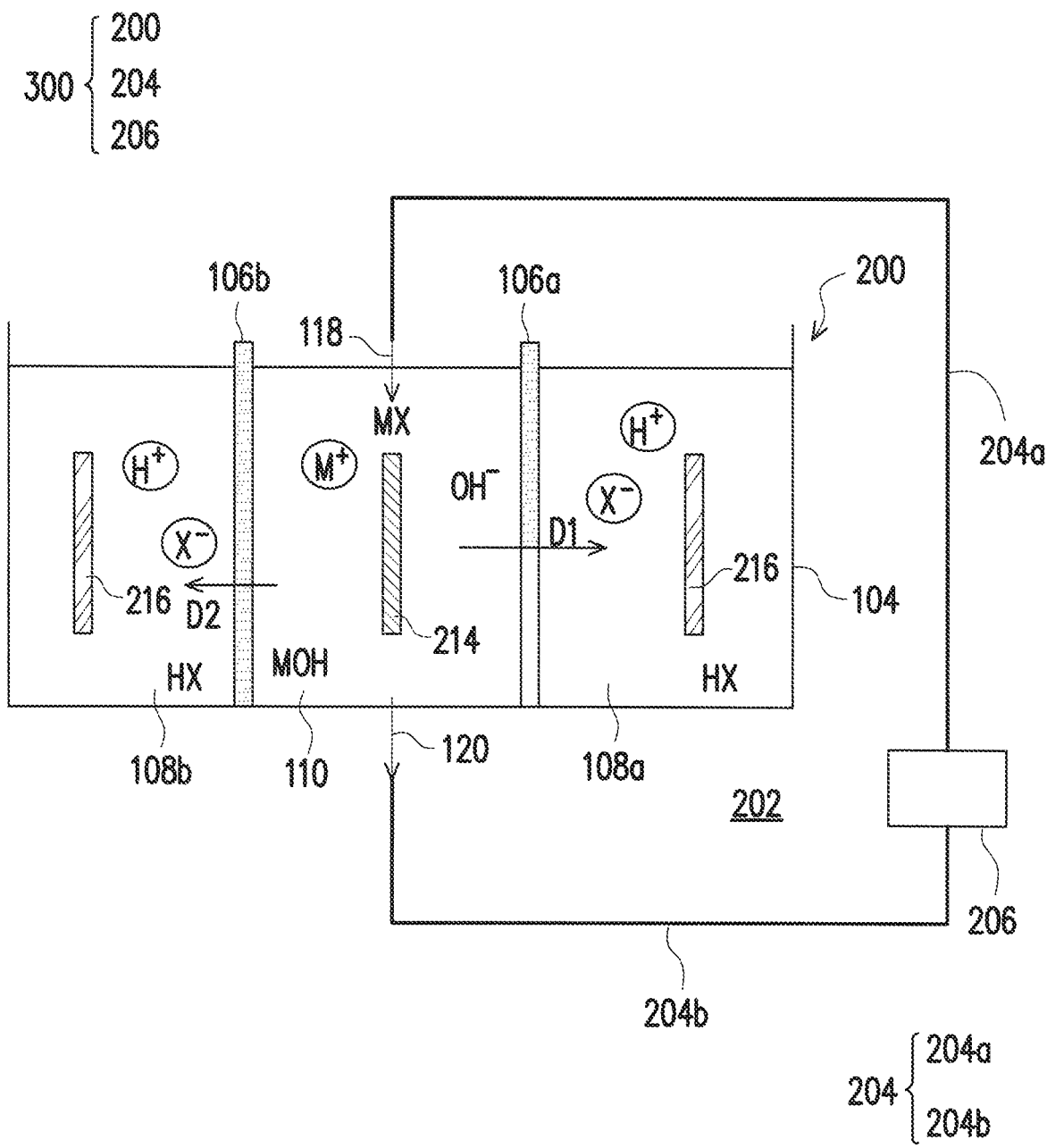
FIG. 4 is a schematic diagram illustrating an electrodialysis system according to yet another exemplary embodiment of the disclosure.
Figure 5:
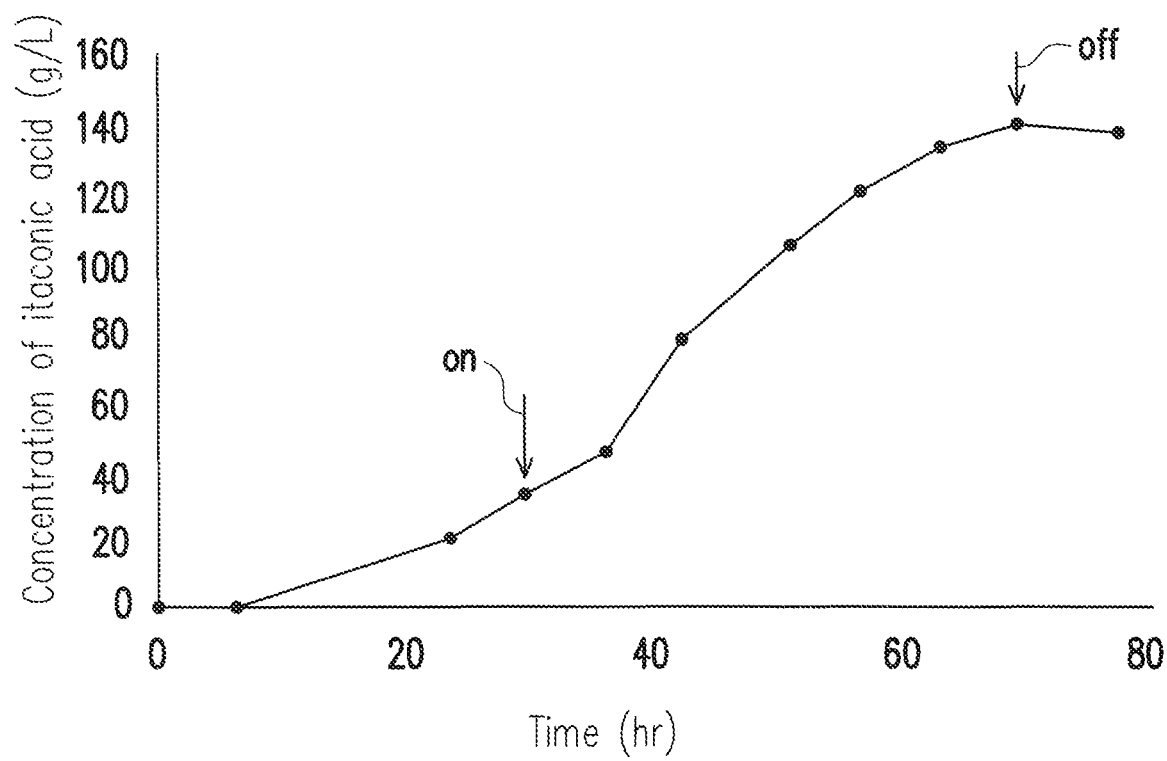
FIG. 5 is a curve diagram illustrating the relationship between concentration and time during the purification of itaconic acid by the electrodialysis system according to an exemplary embodiment of the disclosure.

FIG. 4 is a schematic diagram illustrating an electrodialysis system according to an embodiment of the disclosure. FIG. 5 is a curve diagram illustrating the relationship between concentration and time during the purification of itaconic acid by the electrodialysis system according to an embodiment of the disclosure.

Referring to FIG. 4, in some embodiments, the electrodialysis module 200 may be connected to an application unit 206 via connectors 204 (204a and 204b) to form an electrodialysis system 300. The application unit 206 may include a fermentation tank, a membrane filter unit, a biological filter unit, an isolation and purification unit, or a combination thereof. The membrane filter unit may be the unit for ultra filtration (UF), nano filtration (NF), reverse osmosis (RO), or a combination thereof, but the disclosure is not limited thereto. The biological filter unit may be a membrane bioreactor (MBR), a high efficiency biological filter bed (BioNET), or a combination thereof, but the disclosure is not limited thereto.

In an exemplary embodiment, the application unit 206 is a fermentation tank. The application unit 206 is connected to the inlet 118 of the desalination compartment 110 via the connector 204a, and connected to the outlet 120 via the connector 204b, so that the solution in the application unit 206 may be recycled in the desalination compartment 110. That is, in the case that the first electrode 214 in the desalination compartment 110 is a cathode, the solution in the application unit 206 may remove the salt contained in the solution in the desalination compartment 110, so as to obtain the solution with high pH value and lower salt content at the outlet 120. Therefore, the solution with low salt concentration may be returned to the application unit 206 to provide the matrix, and the solution refluxed to the application unit 206 may be used to balance the organic acids (e.g., lactic acid) generated from microbial reaction, so that the activity of the microorganism can be maintained instead of being inhibited (the activity of the microorganism is inhibited in an acidic environment). Thus, in the case without addition of a pH regulator, the microbial reaction in the application unit 206 can still be maintained. On the other hand, in the case that the second electrode 216 in the electrode compartments 108a and 108b is an anode, the anions X⁻ obtained by dialysis through the first ion-exchange membrane 106a and the second ion-exchange membrane 106b (e.g., anion exchange membranes) are combined with the hydrogen ions H⁺ generated by the anode to generate the acid HX in the electrode compartments 108a and 108b, and the concentration of the acid is increased by cycle operation to achieve the goal of product concentration.

Based on the above, the electrodialysis module provided in some aforementioned embodiments may make the salt contained in the solution in the desalination compartment dissociate, so that the cations thereof are moved into the electrode compartment through the ion-exchange membrane to be combined with the hydroxyl ions generated by the cathode in the electrode compartment to generate the alkali (the first electrode is an anode, and the second electrode is a cathode). The electrodialysis module provided in some other aforementioned embodiments may make the salt contained in the solution in the desalination compartment dissociate, so that the anions thereof are moved into the electrode compartment through the ion-exchange membrane to be combined with the hydrogen ions generated by the anode in the electrode compartment to generate the acid (the first electrode is a cathode, and the second electrode is an anode). Thus, the electrodialysis module provided in the aforementioned embodiments may obtain an acid solution or an alkaline solution with high purity in the electrode compartment. Therefore, it can be further widely applied to food and drink (e.g., acid stability of wine tartar, recovery/reuse of process water), acid and alkali recovery (resin regeneration, acid etching, aluminum anodic treatment, metal picking), water recovery (brine concentration, reuse of reverse osmosis concentrated water), organic purification (deacidification, pH control of fermentation, acid/alkali production), pharmaceuticals, fermentation, precious metal recovery, isolation and purification, and other fields.

EXPERIMENTAL EXAMPLES

Experiment 1

FIG. 5 is a curve diagram illustrating the relationship between concentration and time during the purification of itaconic acid by the electrodialysis system according to some exemplary embodiments of the disclosure.

The experiment of purification of itaconic acid was carried out using the aforementioned electrodialysis system 300. In the electrodialysis module 200, the first electrode 214 was a cathode, the second electrode 216 was an anode, and the first ion-exchange membrane 106a and the second ion-exchange membrane 106b were both anion exchange membranes.

The material of the first electrode 214 was stainless steel 304. In a 0.2 wt % NaClO solution, the hydrogen evolution potential of the stainless steel 304 was −1.5 V. Additionally, an itaconic acid stock solution (itaconate, e.g., sodium itaconate) was sequentially processed by the way of glycerol fermentation process, centrifugation (for removing *Aspergillus terreus* cells) and filtration (filtered by a microfilter), and then injected into the electrodialysis module 200.

As shown in FIG. 5, when the electrodialysis module 200 was turned on, since the solution which refluxed to the application unit 206 (e.g., fermentation tank) from the outlet 120 contained the alkali MOH (e.g., NaOH), the acid produced from the microbial action in the application unit 206 (e.g., fermentation tank) may be balanced, so as to maintain the reactivity of the microorganism (increased acidity will inhibit microbial fermentation) and continuously produce itaconate accordingly. Also, by the cycle operation, the itaconic acid ions obtained by dialysis through the anion exchange membranes (the first ion-exchange membrane 106a and the second ion-exchange membrane 106b) may be continuously combined with the hydrogen ions generated by the anode (the second electrode 216) to generate itaconic acid in the electrode compartments 108a and 108b, so that the concentration of itaconic acid is increased continuously. When the electrodialysis module 200 was turned off, the concentration of itaconic acid was no longer increased. Based on this operation model, the electrodialysis module 200 can effectively maintain the reactivity of the microorganism in the application unit 206 (e.g., fermentation tank), and can obtain the itaconic acid solution with high purity in the electrode compartments 108a and 108b by isolating itaconate contained in the solution. That is, as for the electrodialysis module 200 of the aforementioned embodiments, it not only improves the concentration of itaconic acid by the acidification reaction caused by the electrodialysis reaction and the solubility difference, but also effectively reduce the required buffer agent (e.g., pH regulator).

Otherwise, the glycerol matrix can be supplied by the reflux, and the cost of front-end fermentation and back-end isolation and purification can be reduced.

Experiment 2

Figure 6:
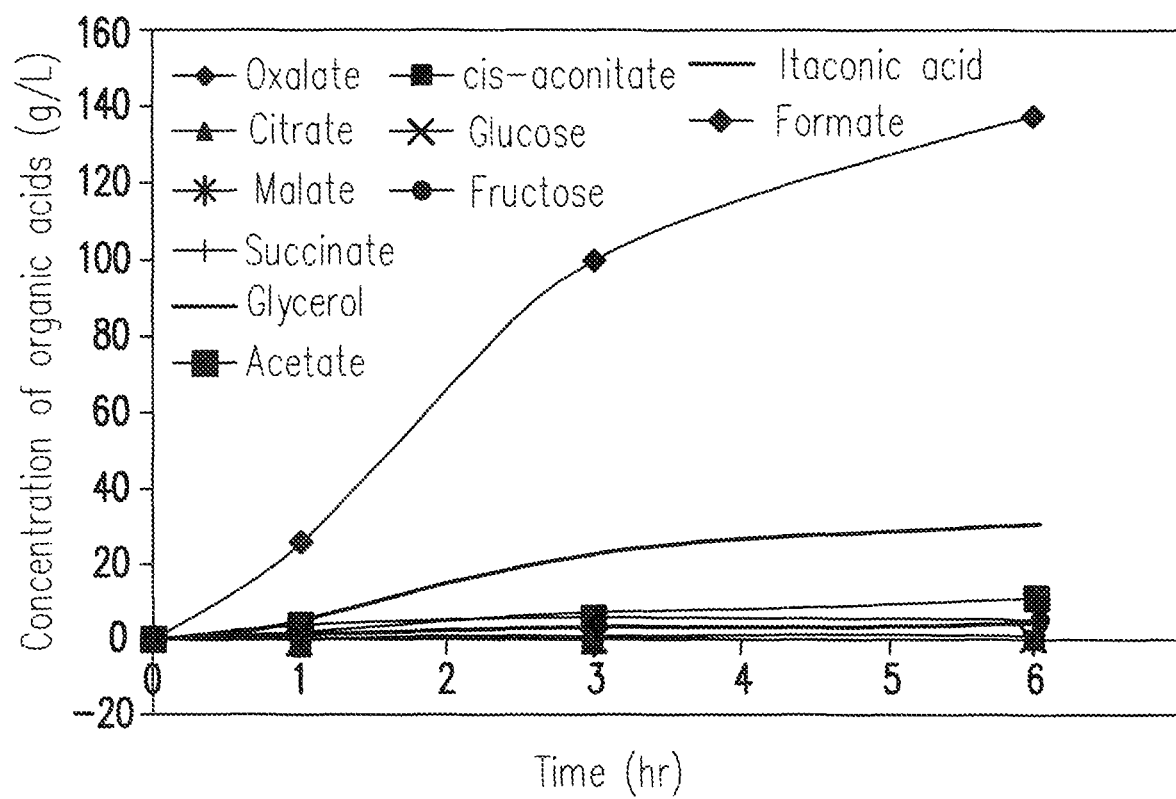
FIG. 6 is a curve diagram illustrating the relationship between concentration and time during the purification of different acid solutions by the electrodialysis system according to another exemplary embodiment of the disclosure.

FIG. 6 is a curve diagram illustrating the relationship between concentration and time during the purification of different acid solutions by the electrodialysis system according to some exemplary embodiment of the disclosure.

The experiment of purification of different acid solutions was carried out using the aforementioned electrodialysis module 200. In the electrodialysis module 200, the first electrode 214 was a cathode, the second electrode 216 was an anode, and the first ion-exchange membrane 106a and the second ion-exchange membrane 106b were both anion exchange membranes.

The material of the first electrode was stainless steel 304. In a 0.2 wt % NaClO solution, the hydrogen evolution potential of the stainless steel 304 was −1.5 V.

The acid solutions were illustrated by oxalate, citrate, malate, succinate, glycerol, acetate, cis-aconitate, glucose, fructose, itaconic acid (IA), and formate as an example. The experimental results were shown in FIG. 6 and Table 1.

TABLE 1

| Acid solution | Acid production (g/hr) |
|---|---|
| oxalate | 0.065 |
| citrate | 0.636 |
| malate | 0.579 |
| succinate | 0.087 |
| acetate | 0.296 |
| cis-aconitate | 0.01 |
| itaconic acid | 2.831 |

From FIG. 6 and Table 1, the salt contained in the solution in the desalination compartment 110 can be effectively isolated by the electrodialysis module 200 of the aforementioned embodiments, so that the acid ions obtained by dialysis through the anion exchange membranes were combined with the hydrogen ions generated by the anode to generate the acid in the electrode compartments 108a and 108b, and the concentration of the acid was increased by the cycle operation to achieve the goal of product concentration. Additionally, according to the acid dissociation constant ($K_a$) and the pH value of the solution, the degree of difficulty of the combination of different acid ions and hydrogen ions was different. Thus, the yields of various acids were different.

Based on the above, in the electrodialysis module provided in some aforementioned embodiments, the salt contained in the solution may be dissociated in the desalination compartment, and the anions thereof may be moved through the ion-exchange membrane to be combined with the hydrogen ions generated by the anode to generate the acid in the electrode compartment. In the electrodialysis module provided in some other aforementioned embodiments, the salt contained in the solution may be dissociated in the desalination compartment, and the cations thereof are moved through the ion-exchange membrane to be combined with the hydroxyl ions generated by the cathode to generate the alkali in the electrode compartment. Therefore, by the electrodialysis module provided in the aforementioned embodiments, to obtain the acid solution or the alkaline solution with high purity in the electrode compartment can be achieved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electrodialysis module, comprising:
at least one base unit, comprising:
a working tank;
a first ion-exchange membrane, located in the working tank;
a second ion-exchange membrane, located in the working tank, wherein the first ion-exchange membrane and the second ion-exchange membrane together divide the working tank into two electrode compartments and a desalination compartment located between the two electrode compartments;
at least one first electrode, disposed in the desalination compartment, wherein the at least one first electrode has the same polarity as the first ion-exchange membrane and the second ion-exchange membrane; and
at least two second electrodes, disposed in each of the electrode compartments respectively, wherein the at least two second electrodes and the at least one first electrode have different polarities,
wherein the at least one first electrode is an anode, and the at least one first electrode has an overpotential for oxygen evolution of 1.5 V to 2 V in a sodium hypochlorite solution.

2. The electrodialysis module according to claim 1, wherein a material of the at least one first electrode is selected from the group consisting of iridium oxide, lead oxide, lead, silver, iron, platinum, stainless steel, titanium, an oxide thereof, an alloy thereof and a combination thereof.

3. The electrodialysis module according to claim 1, wherein the at least two second electrodes are cathodes, and a material of the at least two second electrodes are selected from the group consisting of stainless steel, iron, platinum, titanium, iridium oxide, mercury, an oxide thereof, an alloy thereof and a combination thereof.

4. The electrodialysis module according to claim 1, wherein the first ion-exchange membrane and the second ion-exchange membrane are cation exchange membranes.

5. An electrodialysis module comprising:
at least one base unit, comprising:
a working tank;
a first ion-exchange membrane, located in the working tank;
a second ion-exchange membrane, located in the working tank, wherein the first ion-exchange membrane and the second ion-exchange membrane together divide the working tank into two electrode compartments and a desalination compartment located between the two electrode compartments;
at least one first electrode, disposed in the desalination compartment, wherein the at least one first electrode has the same polarity as the first ion-exchange membrane and the second ion-exchange membrane; and
at least two second electrodes, disposed in each of the electrode compartments respectively, wherein the at least two second electrodes and the at least one first electrode have different polarities, wherein the at least one first electrode is a cathode, and the at least one first electrode has an overpotential for hydrogen evolution of −0.5 V to −1.5 V in a sodium hypochlorite solution.

6. The electrodialysis module according to claim 5, wherein a material of the at least one first electrode is selected from the group consisting of stainless steel, iron, platinum, and titanium.

7. The electrodialysis module according to claim 5, wherein the at least two second electrodes are anodes, and a material of the at least two second electrodes are selected from the group consisting of iridium oxide, ruthenium oxide, lead oxide, copper, zinc, lead, aluminum, gold, and a combination thereof.

8. The electrodialysis module according to claim 5, wherein the first ion-exchange membrane and the second ion-exchange membrane are anion exchange membranes.

9. An electrodialysis system, comprising:
the electrodialysis module according to claim 1; and
an application unit, connected to the electrodialysis module by a connector.

10. The electrodialysis system according to claim 9, wherein the application unit comprises a fermentation tank, a membrane filter unit, a biological filter unit, an isolation and purification unit, or a combination thereof.

11. An electrodialysis module, comprising:
at least one base unit, comprising:
a working tank;
a first ion-exchange membrane, located in the working tank;
a second ion-exchange membrane, located in the working tank;
two partitions, disposed in the working tank, wherein the two partitions have liquid permeability, and are not ion-exchange membranes, and the two partitions, the first ion-exchange membrane, and the second ion-exchange membrane together divide the working tank into two electrode compartments, two inter-compartments, and a desalination compartment located between the two inter-compartments, and each of the inter-compartments is located between the desalination compartment and the corresponding electrode compartment;
at least one first electrode, disposed in the desalination compartment; and
at least two second electrodes, disposed in each of the electrode compartments respectively, wherein the at least two second electrodes and the at least one first electrode have different polarities.

12. The electrodialysis module according to claim 11, wherein the first ion-exchange membrane and the second ion-exchange membrane have the same polarity.

13. The electrodialysis module according to claim 12, wherein the two partitions comprise an ion-exchange membrane having different polarity from the first ion-exchange membrane and the second ion-exchange membrane.

14. The electrodialysis module according to claim 11, wherein the at least one first electrode has the same polarity as the first ion-exchange membrane and the second ion-exchange membrane.

15. An electrodialysis system, comprising:
the electrodialysis module according to claim 11; and
an application unit, connected to the electrodialysis module by a connector.

16. The electrodialysis system according to claim 15, wherein the application unit comprises a fermentation tank, a membrane filter unit, a biological filter unit, an isolation and purification unit, or a combination thereof.

* * * * *